(12) United States Patent
Peterson et al.

(10) Patent No.: US 6,712,025 B2
(45) Date of Patent: Mar. 30, 2004

(54) RECEIVER/STIMULUS UNIT FOR AN ANIMAL CONTROL SYSTEM

(75) Inventors: Frederic T. Peterson, Chelmsford, MA (US); Robert M. Kelly, Burlington, MA (US); James Bannister, Mont Vernon, NH (US)

(73) Assignee: Dogwatch, Inc., Natick, MA (US)

( * ) Notice: Subject to any disclaimer, the term of this patent is extended or adjusted under 35 U.S.C. 154(b) by 0 days.

(21) Appl. No.: 09/976,996

(22) Filed: Oct. 12, 2001

(65) Prior Publication Data

US 2002/0050250 A1 May 2, 2002

Related U.S. Application Data

(60) Provisional application No. 60/269,489, filed on Feb. 16, 2001, and provisional application No. 60/240,229, filed on Oct. 13, 2000.

(51) Int. Cl.$^7$ ............................................... A01K 29/00
(52) U.S. Cl. ....................................................... 119/721
(58) Field of Search ................................ 119/712, 718, 119/719, 720, 721

(56) References Cited

U.S. PATENT DOCUMENTS

| | | | | |
|---|---|---|---|---|
| 4,335,682 A | * | 6/1982 | Gonda et al. ................ | 119/719 |
| 5,207,178 A | * | 5/1993 | McDade et al. ............. | 119/859 |
| 5,471,954 A | * | 12/1995 | Gonda et al. ................ | 119/859 |
| 5,957,093 A | * | 9/1999 | Balaun ......................... | 119/859 |
| 6,360,697 B1 | * | 3/2002 | Williams ...................... | 119/720 |

* cited by examiner

Primary Examiner—Thomas Price
(74) Attorney, Agent, or Firm—Weingarten, Schurgin, Gagnebin & Lebovici LLP (57) ABSTRACT

A receiver/stimulus unit for an animal control system is mounted on an animal collar. The unit includes a power supply enclosure for a power source such as a battery separate from a receiver enclosure containing signal receiving circuitry. The power source is in electrical communication with the signal receiving circuitry via an electrical communication path passing on or through a portion of the strap of the collar.

33 Claims, 6 Drawing Sheets

RECEIVER/STIMULUS UNIT FOR AN ANIMAL CONTROL SYSTEM

CROSS REFERENCE TO RELATED APPLICATIONS

Applicants claim priority under 35 U.S.C. §119(e) to U.S. provisional application Nos. 60/240,229 filed Oct. 13, 2000 and 60/269,489 filed Feb. 16, 2001, the disclosures of which are incorporated herein by reference.

STATEMENT REGARDING FEDERALLY SPONSORED RESEARCH OR DEVELOPMENT

N/A

BACKGROUND OF THE INVENTION

Animal control systems are well known. Examples of such a system are found in U.S. Pat. No. 5,465,687 and U.S. Pat. No. 5,353,744, both assigned to the assignee of the present application and incorporated herein by reference. A transmitter generates a signal, such as a coded amplitude modulation (AM) or frequency modulation (FM) signal, that is radiated by a wire-loop antenna. The wire-loop antenna is buried a few inches underground and defines an area in which the animal is to be contained or from which the animal is to be restricted. A battery-powered receiver mounted on a collar placed around the neck of the animal includes one or more electrodes that are in physical contact with the skin of the animal. The battery and receiver circuitry are contained in a single housing on the collar. As the animal and receiver approach the wire-loop antenna, the receiver detects the radiated signal. The received signal is measured and, if the received signal qualifies, a stimulus is applied to the animal. The stimulus may be an audible alert or an electric shock administered to the animal through the electrodes.

SUMMARY OF THE INVENTION

The present invention relates to an animal control system having a receiver/stimulus unit mounted on an animal collar. The power source, such as a battery or batteries, is contained in a power supply enclosure separate from a receiver enclosure that contains signal receiving circuitry. The battery or batteries in the power supply enclosure are in electrical communication with the signal receiving circuitry via an electrical communication path along the strap of the collar. In this manner, the size of the enclosure for the receiver circuitry is reduced. The power supply enclosure may be sealed and permanently affixed to the collar, and the entire collar may be disposable when the power supply runs down. Alternatively, the power supply enclosure may be independently accessible or removable so that the power supply may be replaced without the need to access the receiver enclosure. In the same manner, the receiver enclosure may be separately accessible and/or replaceable so that different or updated receiver circuitry can be used with an existing collar and power supply.

In one embodiment, the power supply enclosure is integrated into the collar at a remote location from the receiver enclosure, such as at a buckle. Electrical connections are embedded within the body or affixed to the surface of the collar to extend longitudinally along the collar between the power supply enclosure and the receiver enclosure. In another embodiment, the receiver enclosure and the power supply enclosure are disposed on opposite sides of the collar strap and connected via electrical conductors extending transversely through the strap. The electrodes of the stimulus/receiver unit may be further configured as fasteners to retain the power supply enclosure to the strap. Insulating coverings, which may be formed integrally with the power supply enclosure, may be provided to cover the base of the electrodes to help prevent dissipation of the correction signal when the animal has wet fur.

The separate power supply enclosure of the present invention allows the use of different types of batteries by altering the power supply enclosure design. A variety of battery types and sizes may be accommodated, including solar-rechargeable batteries.

DESCRIPTION OF THE DRAWINGS

The invention will be more fully understood from the following detailed description taken in conjunction with the accompanying drawings in which.

DETAILED DESCRIPTION OF THE INVENTION

Figure 1:
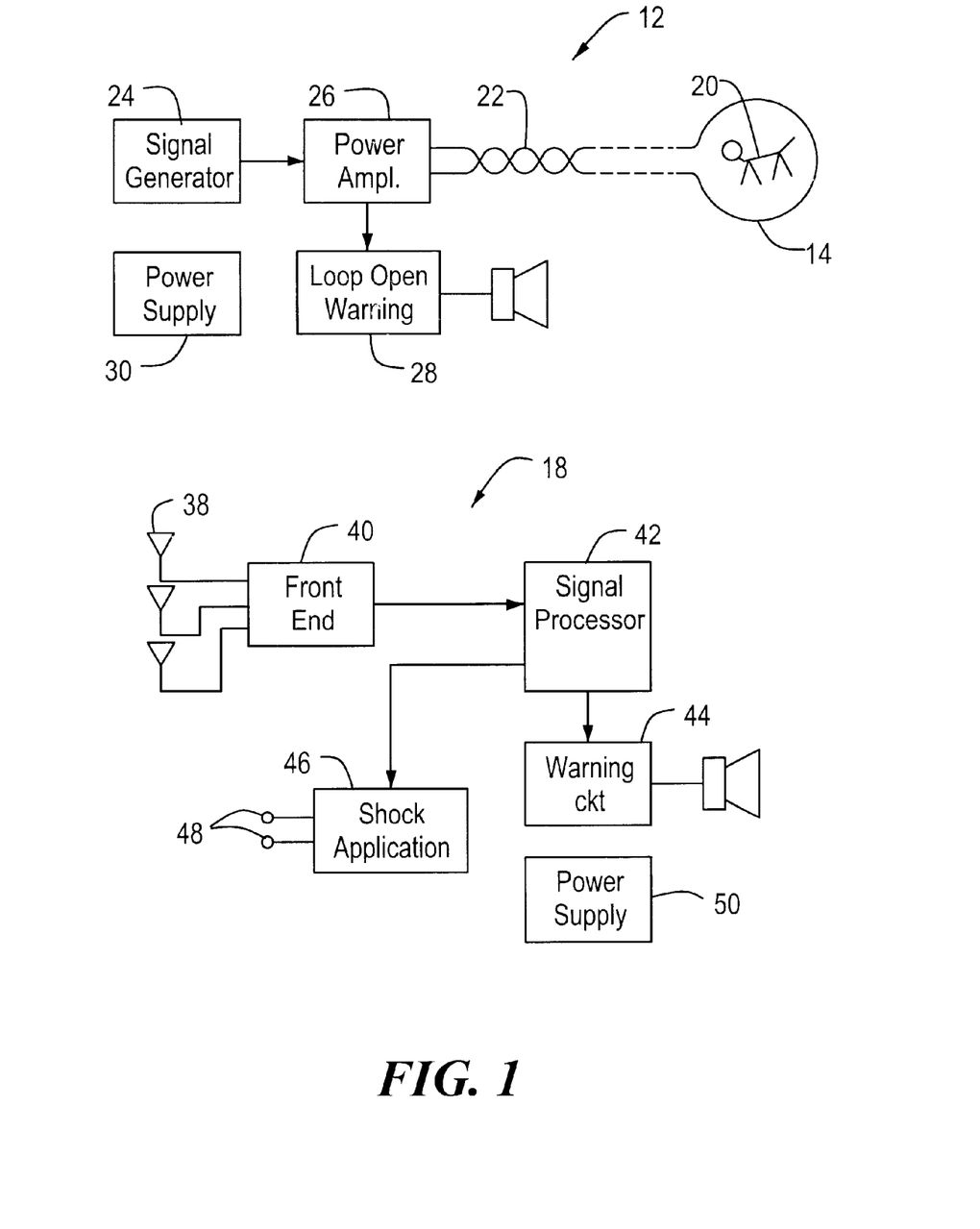
FIG. 1 is a block diagram of an animal control system incorporating the invention.

A block diagram of a system for controlling the movement of an animal, typically a family pet and most commonly a dog, is illustrated in FIG. 1. The system comprises a transmitter/control unit 12 for generating a transmit signal, a wire-loop antenna cable 14 for radiating the transmit signal, and a receiver/stimulus unit 18 for applying a stimulus to an animal 20 upon detection of a qualified transmit signal.

The transmitter/control unit 12 is typically placed in a sheltered location that is accessible to a user for programming the type and rate of the stimulus to be applied to the animal. The antenna cable 14 is installed around the perimeter of a protected area and is typically buried approximately four inches underground. The antenna cable operates as a simple magnetic field induction loop antenna and includes a twisted connecting portion 22 for connecting to the transmitter/control unit. The transmitter/control unit typically comprises a signal generator circuit 24, a power amplifier circuit 26, a loop-open warning circuit 28, and a power supply circuit 30 usually energized from a standard domestic source via an AC adapter.

The receiver/stimulus unit 18 is mounted on the strap of a collar placed around the neck of the animal and detects the radiated transmit signal as the animal approaches the perimeter of the defined area. The animal is usually confined within the area, although the animal may alternatively be restricted from the area. The receiver/stimulus unit 18 applies a stimulus to the animal based on the stimulus information contained in the received transmit signal. The typical animal quickly learns to stay away from the perimeter and to either remain within, or stay outside of, the defined area.

Figure 2:
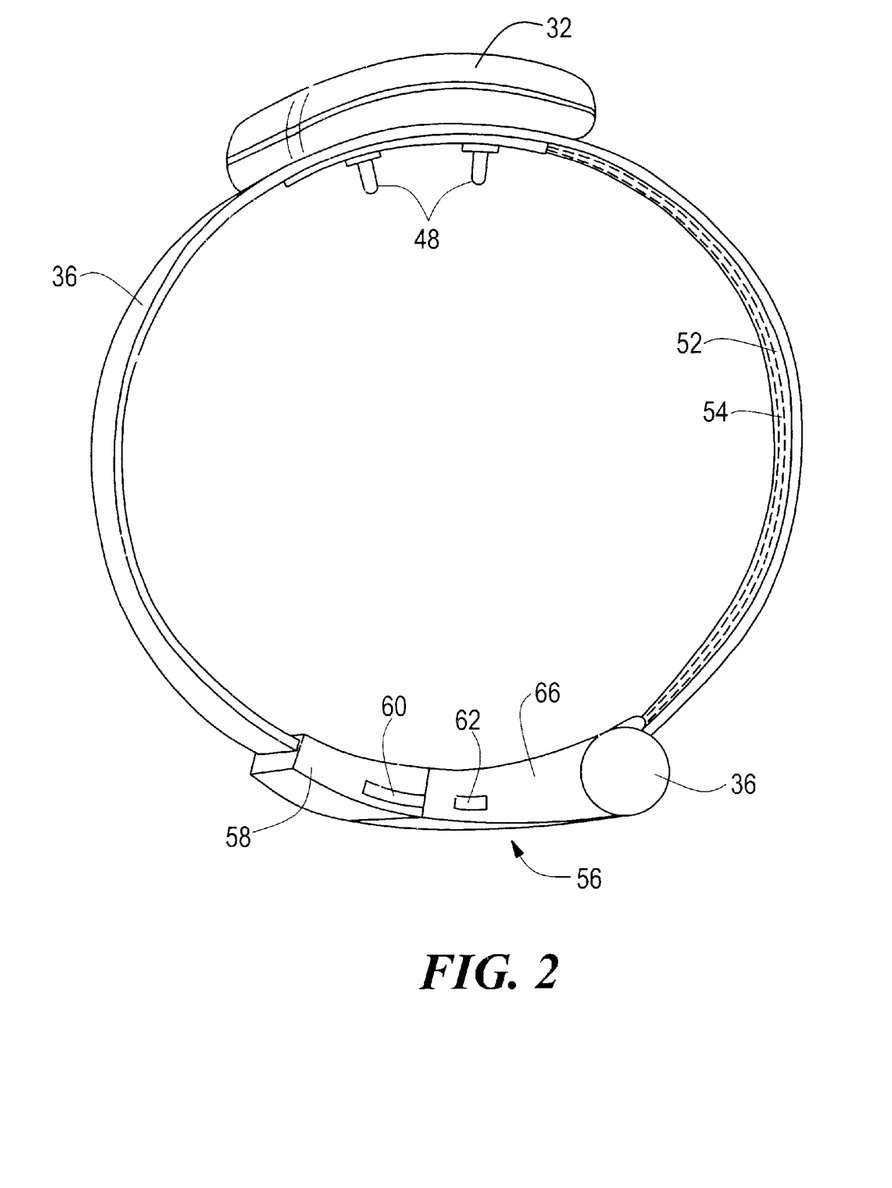
FIG. 2 is an isometric view of an animal collar incorporating the receiver/stimulus unit according to the present invention.

The receiver/stimulus unit comprises a receiver enclosure 32 and a power supply or battery enclosure 34 mounted on a collar strap 36, illustrated in FIG. 2. The power supply enclosure 34 is displaced from and independent of the receiver enclosure 32. Typical components within the receiver enclosure 32 (see FIG. 1) are an antenna assembly 38 having three antennas arranged along mutually orthogonal axes, a front-end circuit 40, a signal processor circuit 42, a warning circuit 44, and a shock application circuit 46. The shock application circuit is coupled to electrodes 48 that protrude to contact the animal's skin. The power supply 50 is typically one or more appropriate batteries contained within the power supply enclosure 34. Electrical connections 52 between the battery in the power supply enclosure 34 and the components in the receiver enclosure 32 are provided via an electrical communication path 54 through or on the collar 36.

Figure 3:
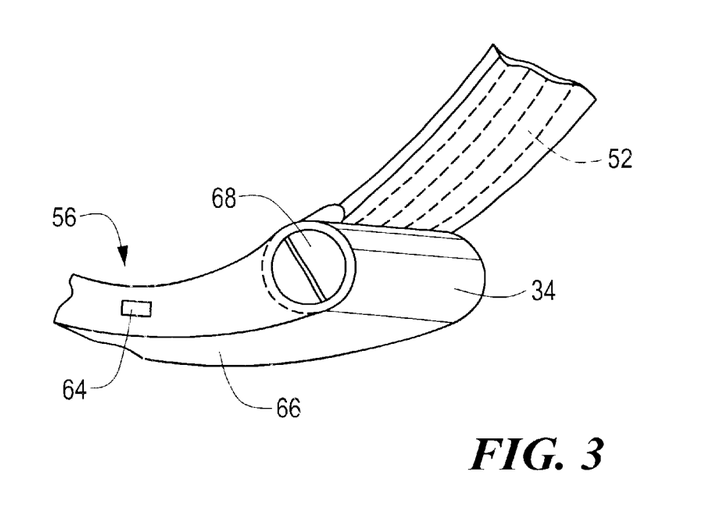
FIG. 3 is a partial view of the power supply enclosure of FIG. 2.
Figure 4:
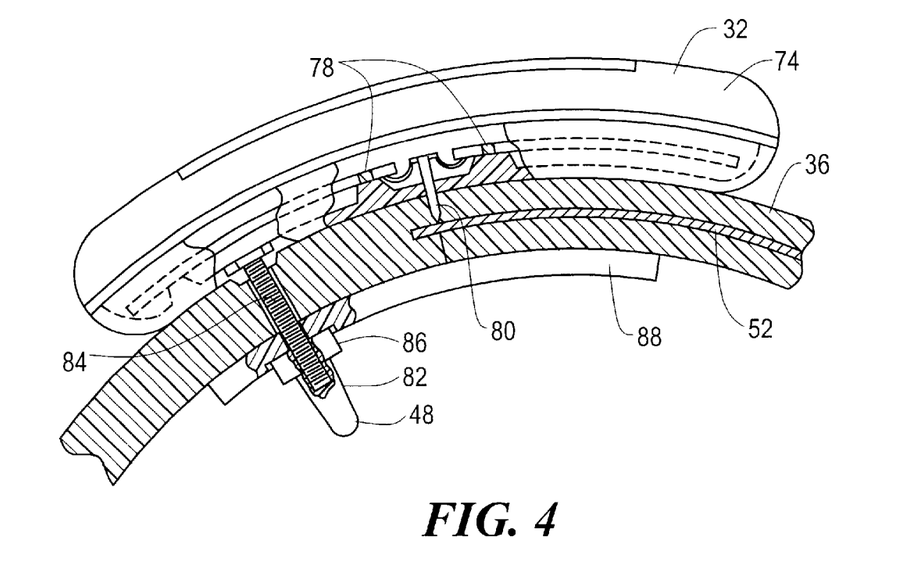
FIG. 4 is a partial cross-sectional view of the receiver housing of FIG. 2.

In the embodiment illustrated in FIGS. 2–4, the power supply enclosure 34 is integrated into a buckle 56 of the collar at a remote location from the receiver enclosure 32. The buckle may have any suitable form. In the embodiment shown, the buckle is a two-piece plastic snap-lock type buckle having a first piece 58 including flexible arms 60 with protrusions 62 that fit within slots 64 in a second piece 66. The buckle is opened by squeezing the flexible arms inwardly to release the protrusions from the slots. The power supply enclosure 34 is formed as a water-resistant casing integrated into one of the buckle pieces. The power supply enclosure is illustrated integrated into the second piece 66, although it could also be integrated into the first piece 58. The buckle and the power supply enclosure may be formed from any suitable insulating material, such as a plastic, a nylon, or a composite material.

In the embodiment shown in FIGS. 2 and 3, the power supply enclosure 34 has a cylindrical form, suitable for containing a cylindrical battery. A removable closure 68 may be provided at one end of the enclosure to allow the battery to be removed and replaced with a fresh battery if desired. Alternatively, the battery may be sealed within the enclosure and the entire collar disposed of when the battery runs down. Appropriate terminals are located at opposed ends of the enclosure. One terminal may be attached to the closure, if present, for the enclosure. Electrical connections 52 are embedded within the body of the collar strap 36 to extend between the power supply enclosure 34 and the receiver enclosure 32. The electrical connections may be copper wires or flexible circuit wiring. The collar strap is formed of any suitable insulating material, such as a nylon, a plastic, a fabric, or a composite material. Alternatively, the electrical connections may be affixed to a surface of the collar if desired. The electrical connections may be embedded within or affixed to the surface of the collar in any suitable manner, such as by extrusion, insert molding, laminating, ultrasonic welding, or use of an appropriate adhesive(s).

Figure 5:
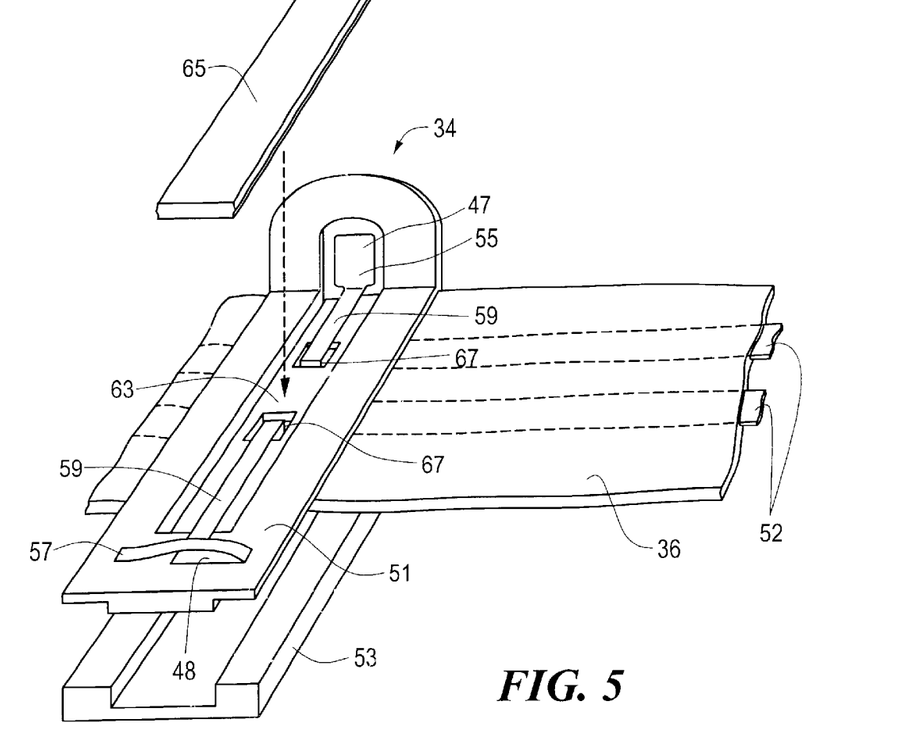
FIG. 5 is an exploded isometric view of a connection between a power supply enclosure and embedded conductors.
Figure 6:
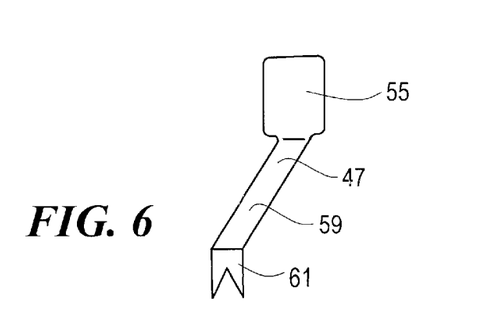
FIG. 6 is an isometric view of a terminal of FIG. 5.

FIGS. 5 and 6 illustrate an example of embedded conductors 52 connected to battery terminals 47, 48 in a power supply enclosure 34. The power supply enclosure includes a plate 51 to which the terminals are affixed and a base 53. The strap 36 is sandwiched between the plate and the base, and retained therein in any appropriate manner. (Other portions of the power supply enclosure are omitted for clarity.) One end 55, 57 of each terminal is biased for contact with a battery (not shown). Each terminal includes an extending arm 59 ending with a depending pronged portion 61 (see FIG. 6) that penetrates the collar strap 36 into the conductors 52 to make electrical contact therewith. The extending arms may be laid in a recess 63 of the plate 51 and covered with a protective cover 65. The pronged portions 67 extend through appropriately sized openings in the plate.

Referring to FIG. 4, the receiver enclosure 32 is formed of a water-resistant casing 74, preferably formed in two pieces that are subsequently permanently fastened together in any suitable manner, such as with adhesive, ultrasonic welding, or mechanical fasteners. The casing may be formed of any suitable material, such as a plastic, a nylon, or a composite material. One or more printed circuit boards 78 with the appropriate receiver circuitry, such as the circuitry described above, are provided within the enclosure. An electrically conducting connector pin 80 extends from the casing 74 and penetrates into the collar to contact the electrical connections 52 to the battery. The connector pin may be a piercing connector that has a sharp end able to pierce the material of the collar and the connections 52. The electrodes 48 include conductive posts 82 that protrude from the enclosure 32 and extend through the strap 36 and are operative to press against the animal's skin for application of an electrical shock. The electrodes also serve as fasteners to affix the receiver enclosure to the collar strap, for example, by including threaded posts 84 that pass through openings in a stiff backing plate 88 and the strap of the collar. Nuts 86, which may be integrally formed with the electrodes, abut against the backing plate.

Figure 7:
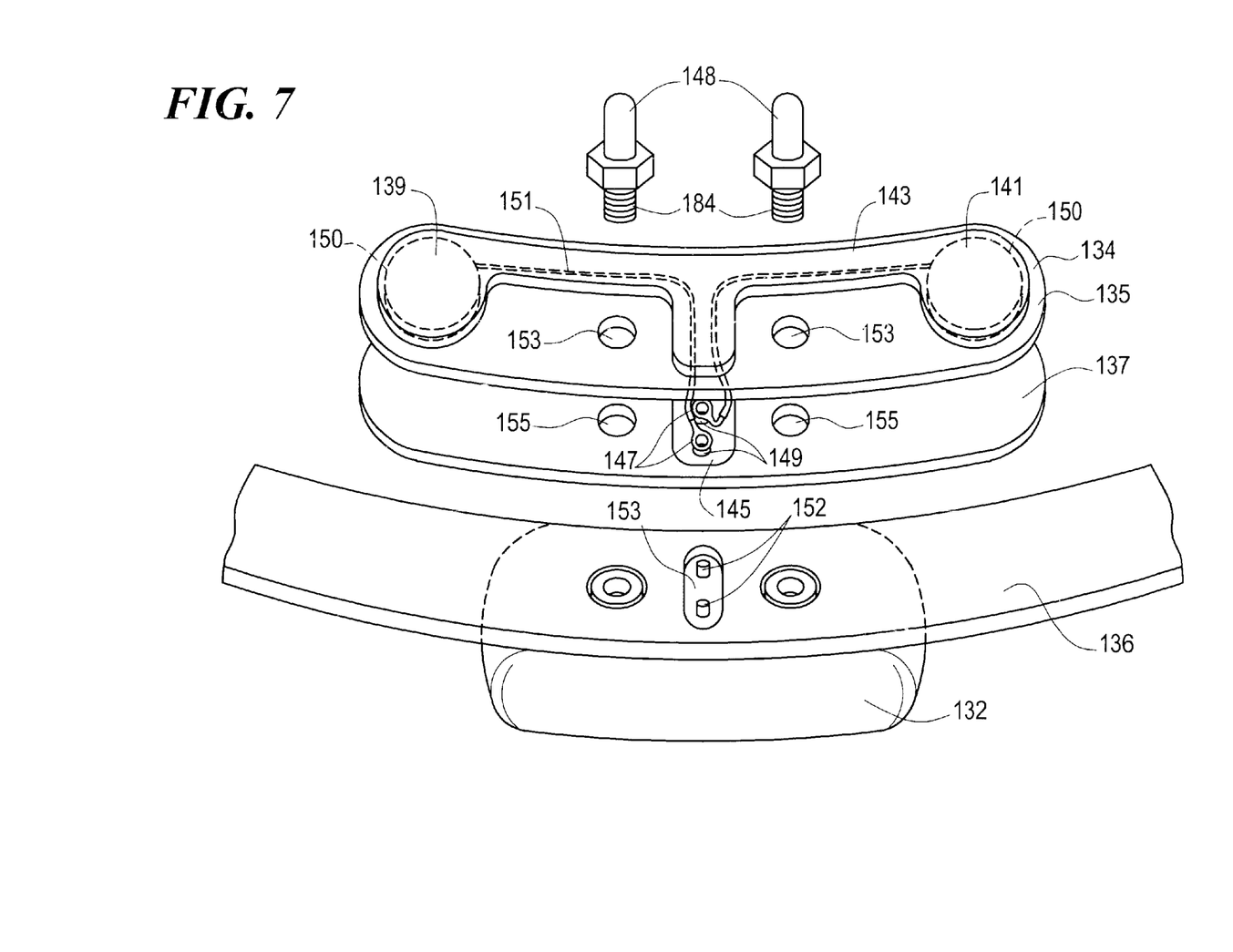
FIG. 7 is an exploded view of a further embodiment of an animal collar receiver/stimulus unit of the present invention.

A further embodiment is illustrated in FIG. 7. In this embodiment, a collar strap 136 is provided having a receiver enclosure 132 affixed to the outer side of the strap. A power supply enclosure 134 is provided affixed to the inner side of the strap. The power supply enclosure 134 is formed from an upper half 135 and a lower half 137 joined together, either permanently or removably, in any suitable manner. The upper half is formed, such as by molding, with two disc-shaped recesses 139, 141 each containing a disc-shaped battery 150. The recesses are connected with a wiring recess 143 to receive wiring from the two batteries to a central terminal region 145 for connection to the circuitry in the receiver enclosure 132. The terminal region includes conductive annular terminals 147 surrounding two openings 149 in the lower half 137 of the power supply enclosure. Conductors 152 extend from the receiver enclosure through an opening 153 in the collar strap 136 and through the two openings 149 in the lower half 137 of the power supply enclosure 134. The conductors 152 are in electrical contact with the annular terminals 147 in the power supply enclosure.

The receiver enclosure 132 is similar to the enclosure described above in connection with FIGS. 2 and 4. The upper and lower halves of the power supply enclosure 134 include a pair of aligned openings 153, 155 through which the conductive posts 184 of the electrodes 148 extend. The conductive posts are threaded to retain the power supply enclosure 134 and the receiver enclosure 132 on the collar strap 136. The receiver enclosure may be removable for replacement or updating of the receiver circuitry by removing the electrodes 148.

Similarly, if the battery needs replacing, the conductive posts 184 are removed from the collar. The power supply enclosure is replaced with a new enclosure containing fresh batteries. Alternatively, the two halves 135, 137 of the power supply enclosure 134 are separated, and the old batteries are removed and replaced with fresh batteries. The two power supply enclosure halves 135, 137 are placed together and repositioned on the collar strap. The conductive posts 184 are replaced, thereby retaining the power supply enclosure 134 on the collar in electrical communication with the receiver.

Figure 8:
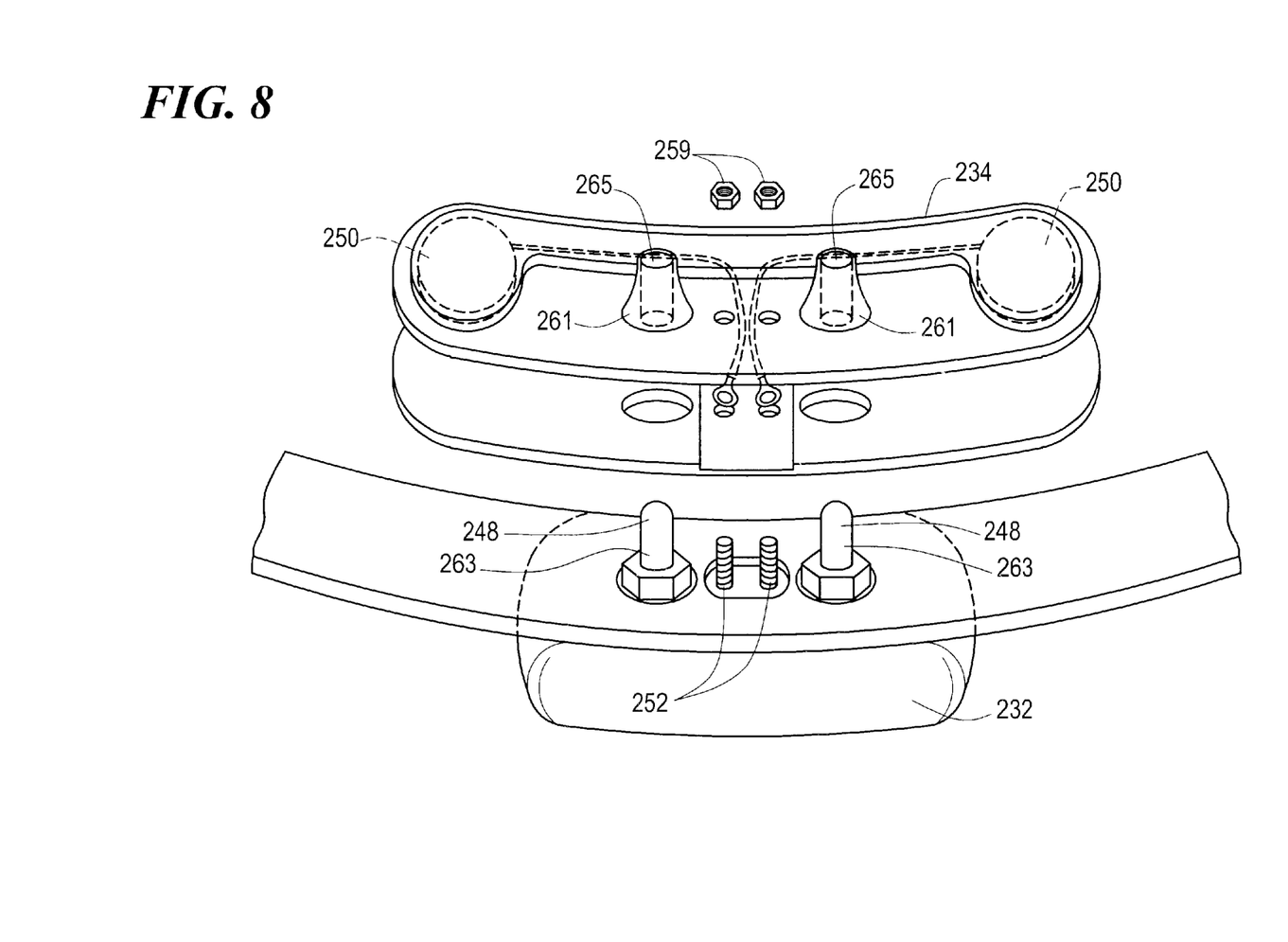
FIG. 8 is an exploded view of a still further embodiment of an animal collar receiver/stimulus unit of the present invention.

A still further embodiment is illustrated in FIG. 8. In this embodiment, electrical conductors 252 between the batteries 250 in the power supply enclosure 234 and the receiver enclosure 232 also serve to retain the power supply enclosure 234 on the collar strap 236. The conductors 252 are externally threaded and nuts 259 cooperatively engage the connectors from ends that protrude through the upper half of the power supply enclosure 234. The power supply enclosure also includes two protruding insulative coverings 261 shaped to enclose the base 263 of the electrodes 248 that extend from the receiver enclosure 232. The insulative coverings, which may be formed integrally with the power supply enclosure 234, such as by molding, have open ends 265 that allow the tips of the electrodes 248 to contact the animal's skin for administering a correction signal, as described above. The insulative coverings help prevent dissipation of the correction signal when the animal has wet fur. The receiver enclosure, power supply enclosure, and/or the batteries may be replaceable as discussed above.

The power supply enclosure may be formed to house any desired type and size of battery. By varying the power supply enclosure, the collar can be easily altered to accommodate new or updated battery designs. The battery may be rechargeable by solar energy using a suitable solar cell disposed on an outwardly and upwardly facing surface, if desired. The receiver/stimulus unit can be used with any pet containment system, remote training collar, or another electronic training product by inclusion of the appropriate circuitry in the receiver enclosure. The invention is not to be limited by what has been particularly shown and described, except as indicated by the appended claims.

What is claimed is:

1. A receiver/stimulus unit for an animal control system comprising:
    a collar comprising a strap configured to fit around a neck of an animal;
    a receiver enclosure containing signal receiving circuitry mounted to the collar;
    a stimulus element in communication with the signal receiving circuitry and disposed to provide a stimulus to the animal; and
    a power supply enclosure separate from and external to the receiver enclosure containing a power source mounted to the collar, the power source in electrical communication with the signal receiving circuitry via an electrical power communication path passing along a portion of the strap of the collar between the receiver enclosure and the power supply enclosure.

2. The receiver/stimulus unit of claim 1, wherein the electrical power communication path passes through a portion of the strap of the collar.

3. The receiver/stimulus unit of claim 1, wherein the electrical power communication path passes over a surface of the strap of the collar.

4. The receiver/stimulus unit of claim 1, wherein the electrical power communication path extends longitudinally along a portion of the strap.

5. The receiver/stimulus unit of claim 1, wherein the communication path extends transversely across the strap.

6. The receiver/stimulus unit of claim 1, wherein the power source comprises at least one battery.

7. The receiver/stimulus unit of claim 6, wherein the at least one battery is rechargeable by solar energy.

8. The receiver/stimulus unit of claim 1, wherein the power supply enclosure includes electrical terminals therein.

9. The receiver/stimulus unit of claim 1, wherein the collar includes a buckle, and the power supply enclosure is disposed within the buckle.

10. The receiver/stimulus unit of claim 9, wherein the buckle comprises a first piece and a second piece, and the power supply enclosure is disposed within one of the first piece or the second piece.

11. The receiver/stimulus unit of claim 1, wherein the receiver enclosure is disposed at a first location on the strap and the power supply enclosure is disposed at a second location on the strap remote from the first location of the receiver enclosure.

12. The receiver/stimulus unit of claim 11, wherein the electrical power communication path is embedded within the strap and extends longitudinally along the strap between the receiver enclosure and the power supply enclosure.

13. The receiver/stimulus unit of claim 11, wherein the electrical power communication path is laid on a surface of the strap and extends longitudinally along the strap between the receiver enclosure and the power supply enclosure.

14. The receiver/stimulus unit of claim 1, wherein the power supply enclosure is cylindrical.

15. The receiver/stimulus unit of claim 14, wherein the power supply enclosure includes a removable closure.

16. The receiver/stimulus unit of claim 1, wherein the power supply enclosure includes electrical terminals therein.

17. The receiver/stimulus unit of claim 16, wherein the power supply enclosure includes a removable closure and at least one of the electrical terminals is disposed on the removable closure.

18. The receiver/stimulus unit of claim 1, wherein the power supply enclosure includes a removable closure.

19. The receiver/stimulus unit of claim 1, wherein the power supply enclosure includes at least one recess configured to receive a battery, electrical terminals disposed within the power supply enclosure, and wiring extending between the battery recess and the electrical terminals.

20. The receiver/stimulus unit of claim 19, wherein the recess is disc-shaped.

21. The receiver/stimulus unit of claim 19, wherein the power supply enclosure includes openings therein to receive electrical conductors on the electrical power communication path, and the electrical terminals are annular and surround the openings in the power supply enclosure.

22. The receiver/stimulus unit of claim 1, wherein the receiver enclosure is disposed on a first longitudinally extending surface of the strap and the power supply enclosure is disposed on an opposite longitudinally extending surface of the strap.

23. The receiver/stimulus unit of claim 22, wherein the electrical communication path extends transversely through the strap between the first surface and the opposite surface.

24. The receiver/stimulus unit of claim 22, wherein the electrical communication path includes electrical conductors extending between the receiver enclosure and the power supply enclosure, the electrical conductors further comprising fasteners disposed to retain the power supply housing on the strap.

25. The receiver/stimulus unit of claim 24, wherein the electrical conductors further comprise an externally threaded post and an internally threaded nut disposed on the post to retain the power supply housing on the strap.

26. The receiver/stimulus unit of claim 1, wherein the stimulus element comprises a pair of electrodes in electrical communication with the receiver circuitry in the receiver enclosure and extending transversely from the strap.

27. The receiver/stimulus unit of claim 26, wherein the electrodes extend through the strap and through the power supply enclosure.

28. The receiver/stimulus unit of claim 26, wherein the electrodes are removably fastened to the receiver enclosure, whereby the electrodes retain the power supply enclosure on the strap.

29. The receiver/stimulus unit of claim 26, further comprising an insulating covering disposed over at least a base portion of each electrode.

30. The receiver/stimulus unit of claim 29, wherein each insulating covering is disposed on the power supply enclosure.

31. The receiver/stimulus unit of claim 29, wherein each insulating covering is integrally formed with the power supply enclosure.

32. The receiver/stimulus unit of claim 1, wherein the stimulus element comprises a pair of electrodes disposed to generate an electrical shock.

33. The receiver/stimulus unit of claim 1, wherein the stimulus element comprises an audible alarm generator.

* * * * *